US 6,666,804 B2

(12) United States Patent
Fabris

(10) Patent No.: US 6,666,804 B2
(45) Date of Patent: Dec. 23, 2003

(54) TWO STAGE CLAMPING PINION

(76) Inventor: Mario Fabris, 184 N. Service Road, Grimsby, Ont (CA), L3M 4E8

( * ) Notice: Subject to any disclaimer, the term of this patent is extended or adjusted under 35 U.S.C. 154(b) by 24 days.

(21) Appl. No.: 10/314,981

(22) Filed: Dec. 10, 2002

(65) Prior Publication Data

US 2003/0125176 A1 Jul. 3, 2003

Related U.S. Application Data

(60) Provisional application No. 60/338,670, filed on Dec. 11, 2001.

(51) Int. Cl.[7] ............................................... B21B 27/02
(52) U.S. Cl. ......................................... 492/21; 464/184
(58) Field of Search ........................... 492/1, 57, 4, 15, 492/21; 29/895.2, 895.21, 895.213, 895.23; 72/247, 249, 237, 252.5; 279/42, 48, 53, 52; 464/179, 183, 182, 184, 172, 175, 177, 162

(56) References Cited

U.S. PATENT DOCUMENTS

| | | | | |
|---|---|---|---|---|
| 4,748,729 A | * | 6/1988 | Rochelmeyer | 492/47 |
| 4,932,111 A | * | 6/1990 | Kark | 492/40 |
| 5,154,074 A | * | 10/1992 | Haraguchi et al. | 72/247 |
| 5,700,233 A | | 12/1997 | Fabris | 492/1 |
| 5,735,788 A | * | 4/1998 | Yasutake et al. | 492/39 |
| 6,526,795 B1 | * | 3/2003 | Fabris | 72/249 |

* cited by examiner

*Primary Examiner*—Gregory Vidovich
*Assistant Examiner*—Marc Jimenez
(74) *Attorney, Agent, or Firm*—Edward H. Oldham

(57) ABSTRACT

A pinion for mounting rolls thereupon for reducing rod or wire in a rolling mill wherein said pinion has a pair of hydraulic pressure chambers formed therein which cause a threaded plug in a cavity in said pinion to undergo lateral movement to expand the pinion to engage a roll mounted on said pinion, and thence to cause a clamp to laterally clamp a roll against an abutment formed on the pinion to clamp the roll on the pinion once the plug has undergo lateral movement.

6 Claims, 8 Drawing Sheets

TWO STAGE CLAMPING PINION

This application claims the benefit of provisional application Ser. No. 60/338,670 filed Dec. 11, 2001.

FIELD OF THE INVENTION

This invention is an improvement over U.S. Pat. No. 5,700,233 issued Dec. 23, 1997.

In the process of the rolled reduction of steel rod or wire from a billet, the billet or bar is usually passed through a multi stage reduction mill wherein the bar is successively passed between pairs of mill rolls which squeeze the bar to reduce its cross sectional area at each rolling stage.

The rolls are mounted on robust cantilevered pinion shafts where slippage between the reducing roll and the pinion cannot be tolerated during a reduction operation.

SUMMARY OF THE INVENTION

This invention seeks to secure a mill roll on a cantilevered pinion by means of the use of pressurized hydraulic fluid. The roll is placed at a predetermined mounting position on the pinion and hydraulic fluid pressure is then introduced into a cavity provided so as to cause a threaded plug to move laterally from its initial position in the cavity provided within the pinion, and thus increase the diameter of the pinion under the roll mounted on the outer surface of the pinion. As soon as the threaded plug moves a predetermined distance in a lateral direction within the cavity, another set of ports is exposed which allows the introduction of pressurized hydraulic fluid into a second cavity to permit a substantial side thrust to be applied to the roll already located on the pinion so as to clamp it tightly against the shoulder provided on the pinion.

PRIOR ART

U.S. Pat. No. 5,700,233 issued Dec. 23, 1997.

DESCRIPTION OF THE PREFERRED EMBODIMENT

Figure 1:
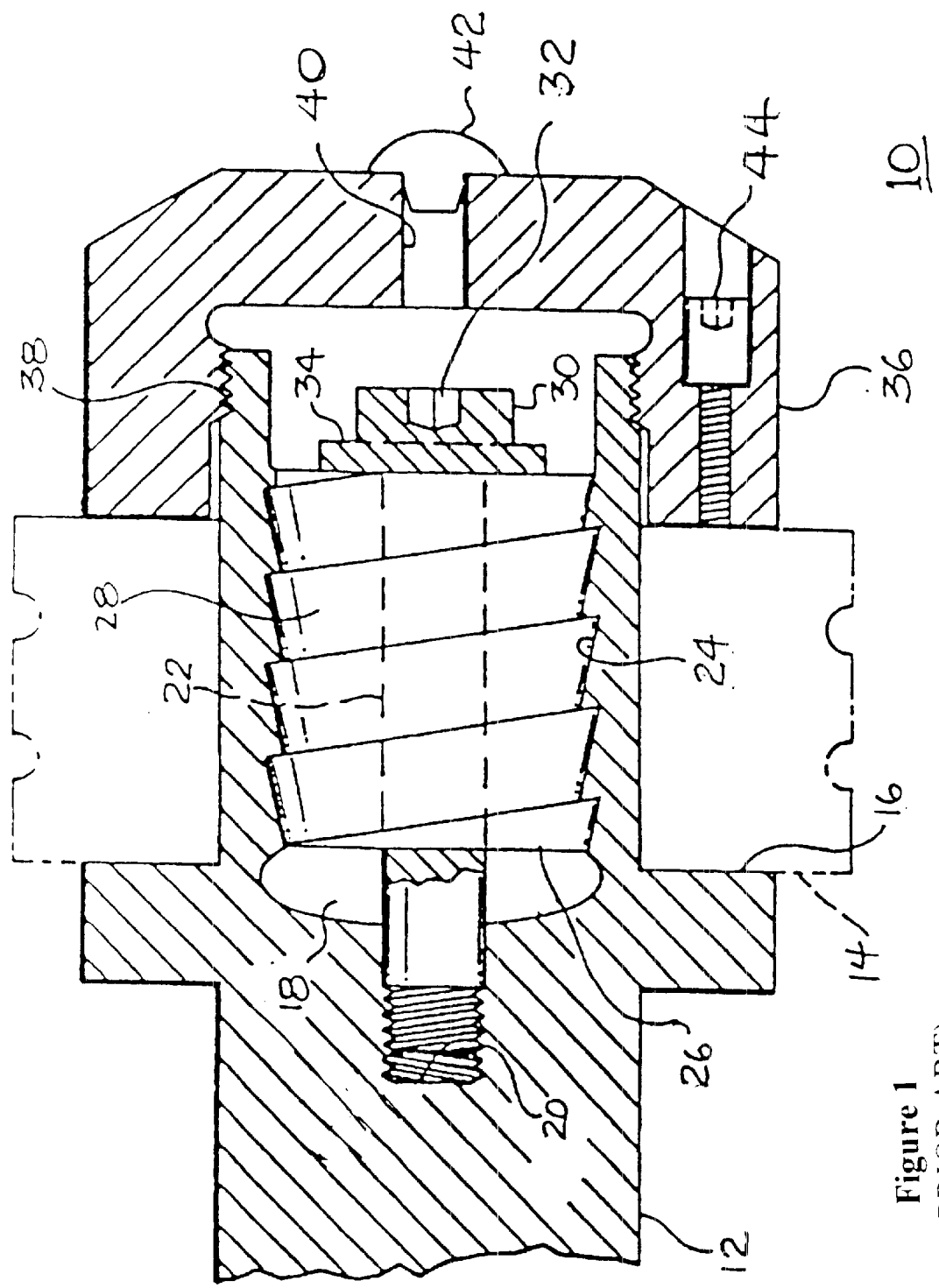
FIG. 1 shows a sectional view of a pinion assembly of the prior art.

Referring to FIG. 1 which shows a prior art pinion assembly 10 in section. A pinion 12 is shown which is coupled to a driving shaft (not shown). A roll 14 (shown in phantom) is mounted on pinion 12 against shoulder 16 on pinion 12.

Pinion 12 is provided with an internal cavity 18 which is provided with a threaded bore 20 for bolt 22. A second coaxial bore 24 is provided in cavity 22 which is provided with a buttress thread. A threaded plug 26 having a mating buttress thread 28 is threaded into the thread 24 of cavity 18. Bolt 22 is provided with head 30 in which a socket receiving receptacle 32 is formed. Bolt head 30 is provided with a thrust shoulder 34 to engage plug 26.

A clamping cap member 36 is threaded onto pinion 12 at threads 38. Cap 36 contains a bore 40 to provide access to the socket formed in the head 30 of bolt 22. Plug 42 prevents the ingress of foreign material into bore 40 of cap 36.

A series of pressure screws 44 (only one shown) are threaded into cap 36 to apply pressure to roll 14 to force it against shoulder 16.

The prior art device functions as follows: Plug 26 is threaded into cavity 18 and bolt 30 is threaded into threaded bore 20 in the cavity 18. No pressure is applied to plug 26 by bolt head 30 at this time.

A roll 14 is now mounted on pinion 12 against shoulder 16. Cap 36 is threaded onto threads 38 of pinion 12 to press roll 14 against shoulder 16. Next bolt 22 is advanced in threaded bore 20 to push plug 26 further into the cavity 18 to "ramp" threads 28 against threads 24 to expand the part of the pinion 12 located below roll 14. This expansion is important because it is uniform around the entire circumference of pinion 12 which engages roll 14. This is important to preserve the concentricity of roll 14 on pinion 12. Next screws 44 are advanced in cap 36 to apply additional pressure on roll 14 to cause it to forcibly engage shoulder 16 of pinion 12 to increase the friction force between shoulder 16 and roll 14 to prevent slippage between roll 14 and pinion 11 during a rolling operation.

Figure 2:
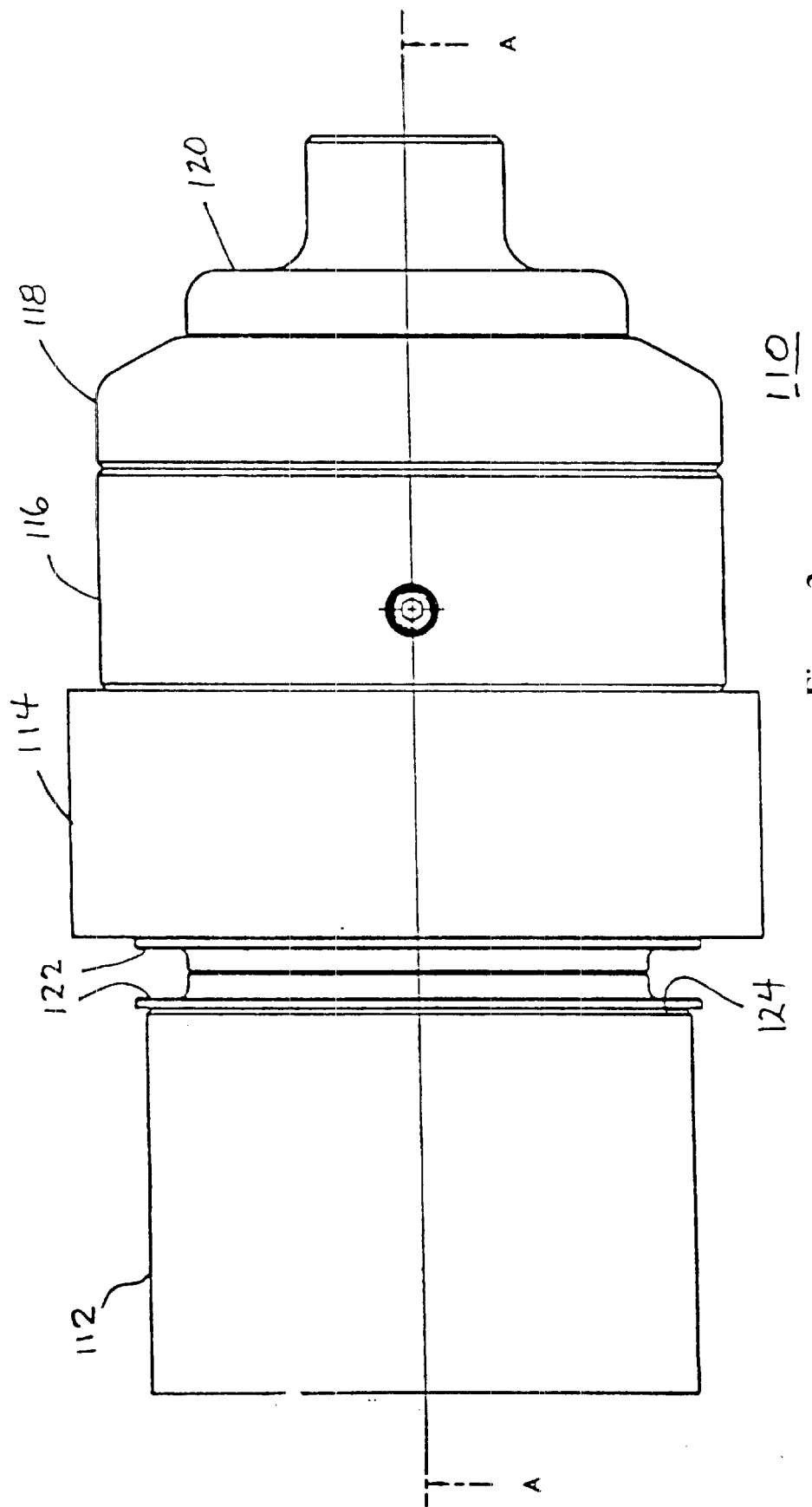
FIG. 2 shows a plan view of a roll mounted on the pinion.

Referring to FIG. 2, the pinion-roller combination 110 of the present invention is illustrated. A pinion 112 is driven by a driveshaft (not shown). A roll 114 is mounted on pinion 112 and is clamped in position by pressure ring 116 and end bell 118. Cap 120 provides protection for the interior elements of end bell 118. A pair of spacer rings 122 are placed between shoulder 124 and roll 114.

Figure 3:
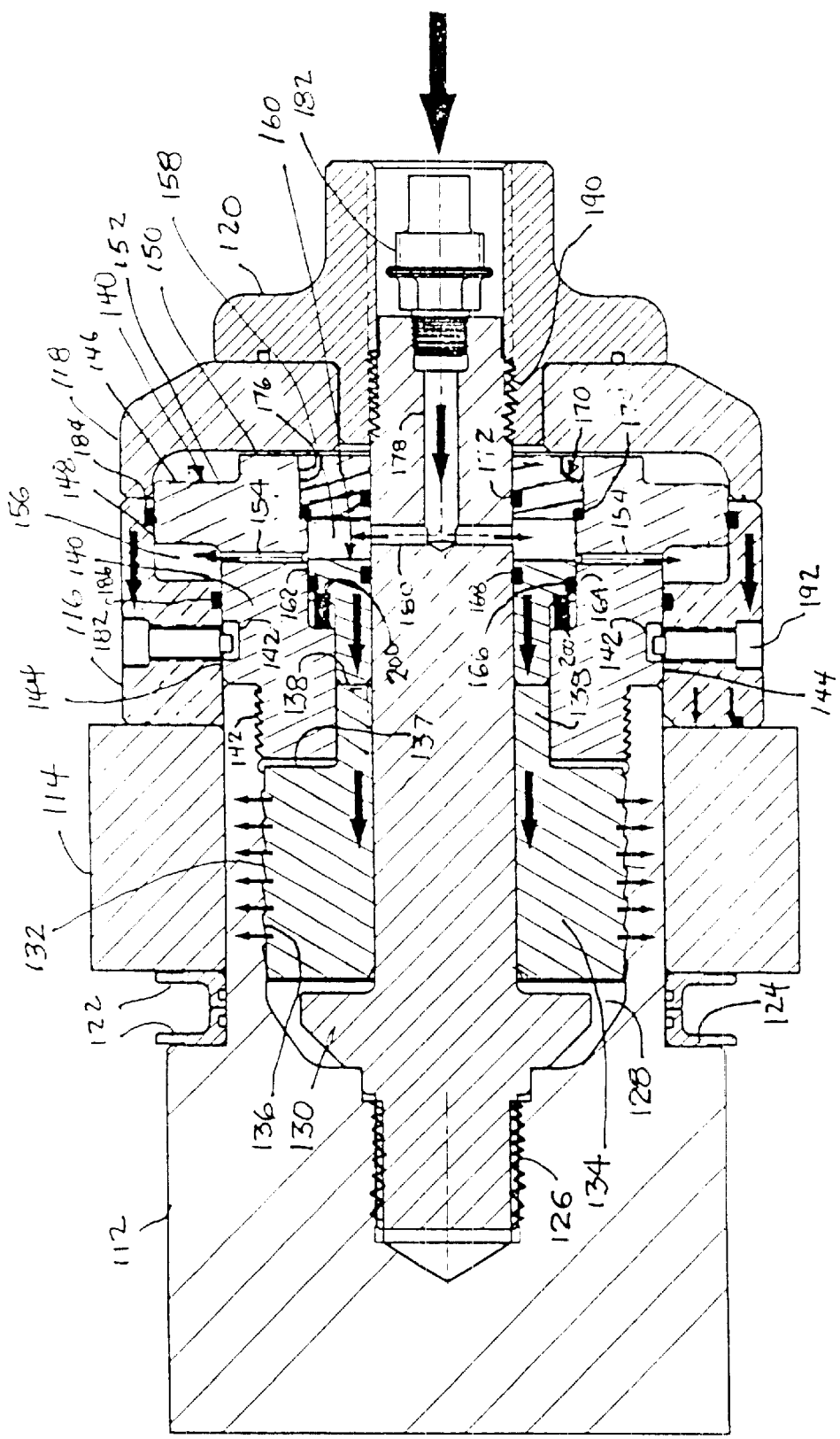
FIG. 3 shows a sectional view of the pinion of FIG. 2.
Figure 4:
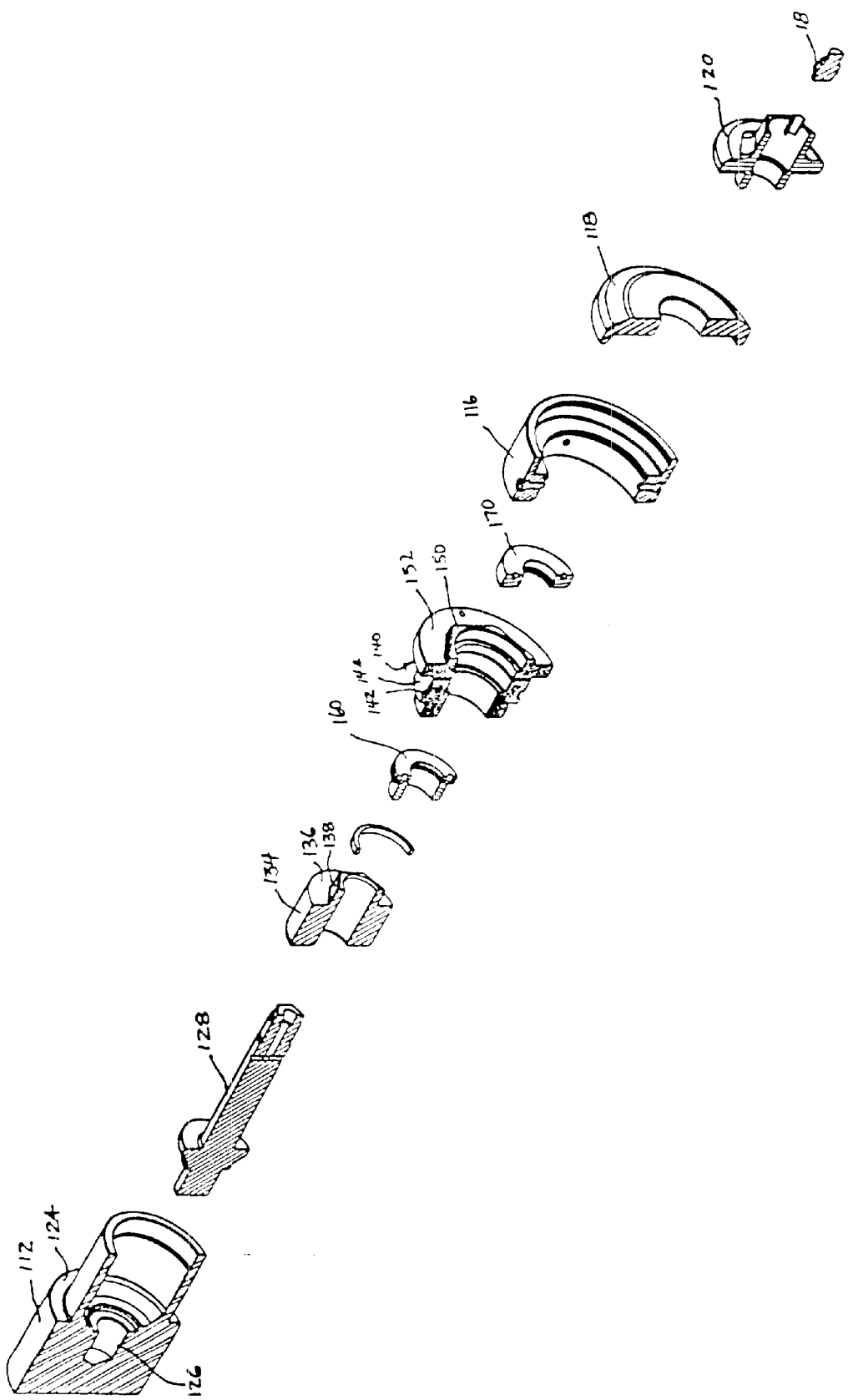
FIG. 4 shows an exploded perspective sectionalized view of the hardware illustrated in FIG. 2.
Figure 5:
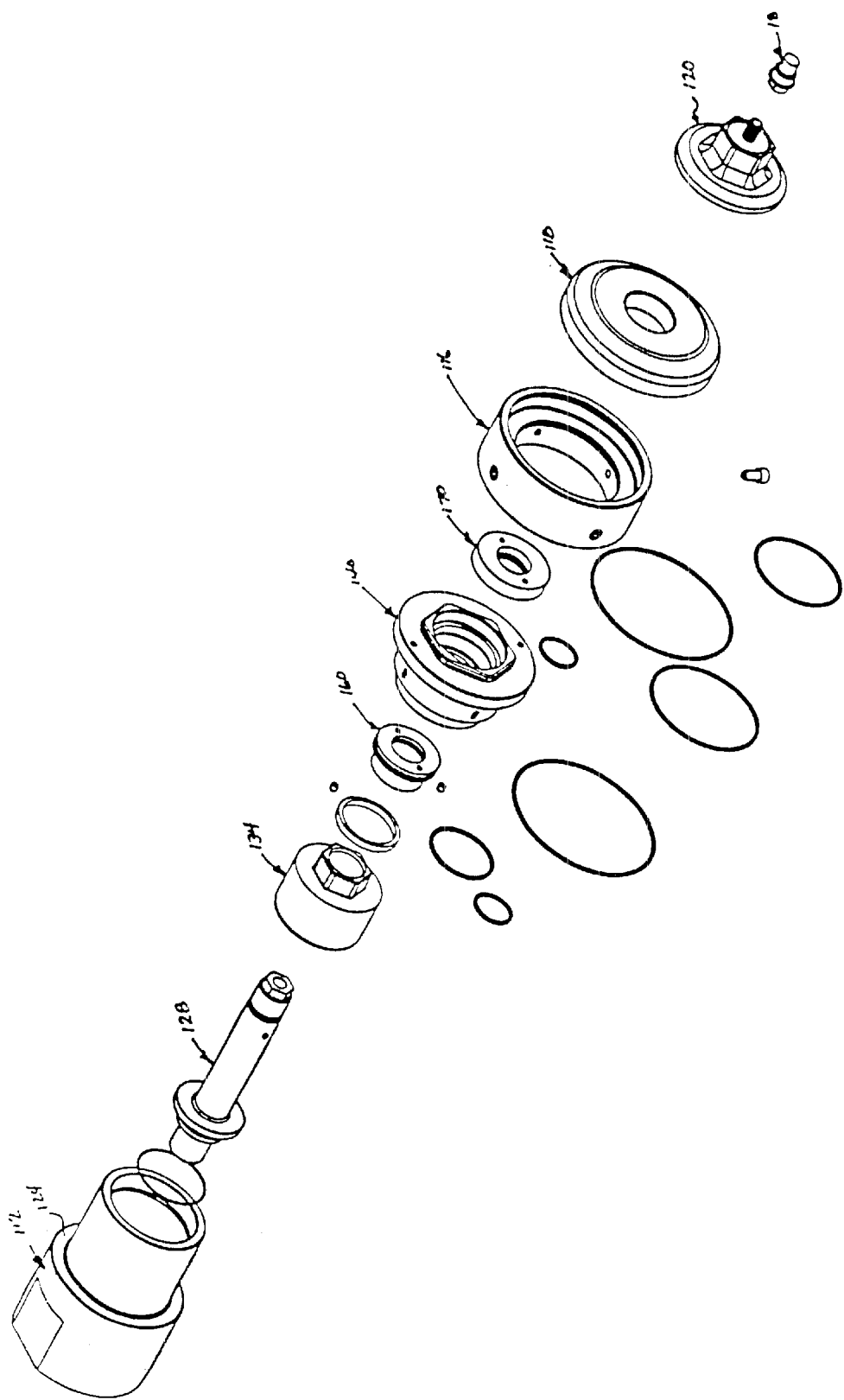
FIG. 5 shows an exploded of the device of FIG. 1.
Figure 6:
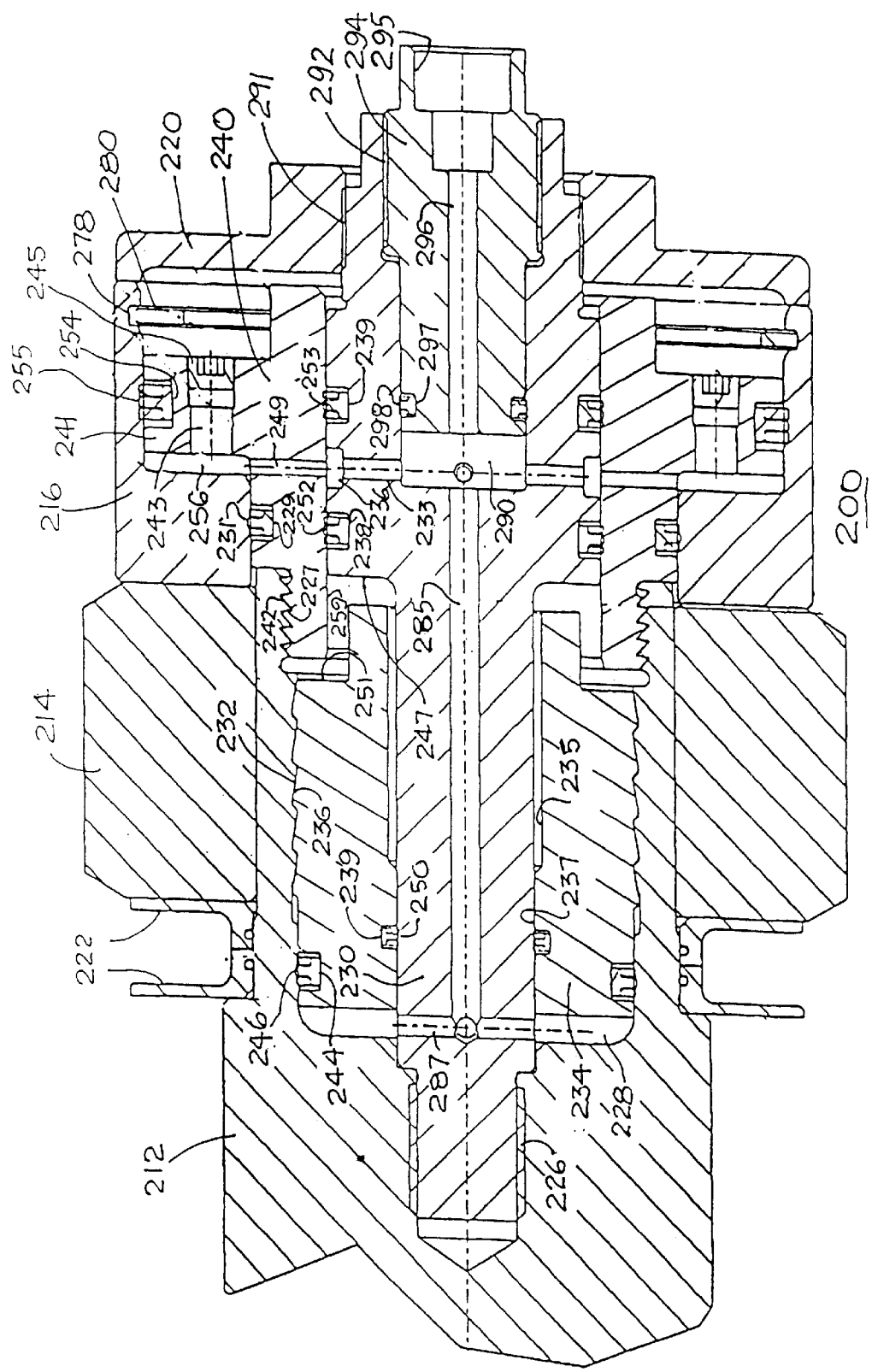
FIG. 6 shows an alternate form of applicant's invention in cross section.

FIG. 3 shows a cross section view of the device of FIG. 2. FIGS. 4 and 5 are additional views (exploded) to aid in understanding the invention.

Pinion 112 is provided with an internal hollow chamber 128 similar to chamber 18 or the prior art device of FIG. 1. Chamber 128 contains a threaded bore 126 in which bolt 130 is threadably received.

Chamber 128 is threaded at 132 in a similar manner to chamber 18 of the prior art device 10 of FIG. 1 with buttress threads. A plug 134 having matching buttress threads 136 is threaded into chamber 128 as shown. Plug 134 is provided with a central clearance bore through which bolt 130 may be passed. Plug 134 is provided with a shoulder 137 and cylindrical thrust collar 138 which is integrally connected to plug 134.

A locking collar 140 is threaded into pinion 112 at threaded bore 142 of the pinion 112.

Locking collar 140 has a series of recesses 142 spaced around the circumference of land 144 and an annular shoulder flange 146 integrally formed therewith. Annular flange 146 is provided with cylindraceous seal surface 148 at the outside of flange 146. An abutment 150 is formed on face 152 of locking collar 140. A plurality of ducts 154 are provided in collar 140 to provide a fluid communication passage between pressure chambers 156 and 158.

A pressure piston 160 is provided to slide on bolt 130 and seal against cylindraceous surface 162 of locking collar 140. Seal 164 is provided in groove 166 of piston 160 for this purpose. A seal ring 168 is located on piston 160 in groove 170 to form a sliding seal with bolt 130.

An annular sealing block 170 is provided to seal with bolt 130 by means of seal ring 172. Sealing block 170 is threaded into locking collar 140 so that seal ring 174 seals block 170 against cylindraceous surface 176. Once assembled the sealing block 170 becomes an integral part of locking collar 140.

Pressure chamber 158 is formed by bolt 130, piston 160, locking collar 140 and sealing block 170.

Bolt 130 is provided with a central bore 178 which is in communication with cross bore 180. A hydraulic pressure fitting 182 is threaded into the end of bolt 130 to communicate with bore 178. Any hydraulic fluid forced into fitting 182 ultimately finds passage to chamber 158 via bores 178 and 180.

A thrust ring 116 is mounted on locking collar 140 to form part of chamber 156. Ring 116 carries a pair of seal rings 184 and 186 to seal on surfaces 148 and 144 of locking collar 140. Pressure chamber 156 is formed between locking collar 140 and thrust ring 116. Duct 154 is shown in communication with chambers 156 and 158 in FIG. 3.

Cap 120 and bell 118 are held in place by threads 190 on bolt 130.

Bell 118 rests against stop 150 in its "rest" position.

Thrust ring 116 is provided with a series of locating screws 192 the ends of which are captured in recesses 142 in locking ring 140 to establish a correct position relationship between locking ring 140 and thrust collar 116.

The pinion and roll are assembled as follows: Bolt 130 is threaded into bore 126 until the desired depth of insertion of bolt 130 is reached. Plug 134 is next threaded into cavity 128 to a predetermined depth. Roll 114 and shims 122 are now slid on pinion 112 to engage shoulder 124 of pinion 112.

Thrust collar 116 is next fitted on locking collar 140 by means of locating screws 192 protruding into recesses 142 of locking collar 140 to the desired depth.

The locking collar 140 (which includes sealing block 170) carrying a loosely mounted thrust collar 116 thereon is threaded into threads 142 of pinion 112.

Piston 160 is slid along bolt 130 until it reaches a "home" position inside locking collar 140 established by the compressible elastic ring 200. At rest, before any hydraulic pressure is applied to chamber 158, surface 162 of piston 160 blocks the entrance to duct 154 so that no hydraulic pressure may be applied to chamber 156 until piston 160 has moved to the left to uncover the entrance to duct 154.

Bell 118 is fitted on cap 120 and cap 120 is threaded onto bolt 130 until bell 118 engages stop 150 on locking collar 140. At this position the bell 118 and thrust ring 116 are in an engaged position in a state ready to have chamber 156 pressurized.

At this time elastic ring 200 holds piston 160 at a "rest" position so that surface 162 blocks ducts 154 leading to chamber 156.

Hydraulic fluid pressure is now applied to fitting 182 fitted into the end of bolt 130 to force fluid into channel 178 and channel 180 and thence into chamber 158.

Cap 120 and bell 118 establish a "blocked" position for blocking ring 170 so that any motion of blocking ring 170 is to the right prevented by bell 118. When the pressure in chamber 158 is sufficient, piston 160 moves to the left causing the external buttress threads on the plug 134 to "ramp" up against the corresponding internal buttress threads on the interior of the cavity 128 of pinion 112.

When piston 160 and plug 134 have moved to the left a distance sufficient to enlarge the diameter of the pinion surface beneath roll 114 and "lock" roll 114 firmly in a concentric position on pinion 112, the entrance to ducts 154 becomes unblocked by the repositioning of piston 160 to the left, hydraulic pressure now is applied to chamber 156. This causes ring 116 to move to the left to firmly clamp the roll 114 against shoulder 124 of pinion 112 to provide the final pressure to lock roll 114 in place on pinion 112. This supplants the force produced by screws 44 of FIG. 1 (prior art).

With this scheme chamber 158 can be partially pressurized before significant pressure is applied to chamber 156 so that the concentricity of the roll 114 mounted on the pinion 112 is preserved.

Figure 7:
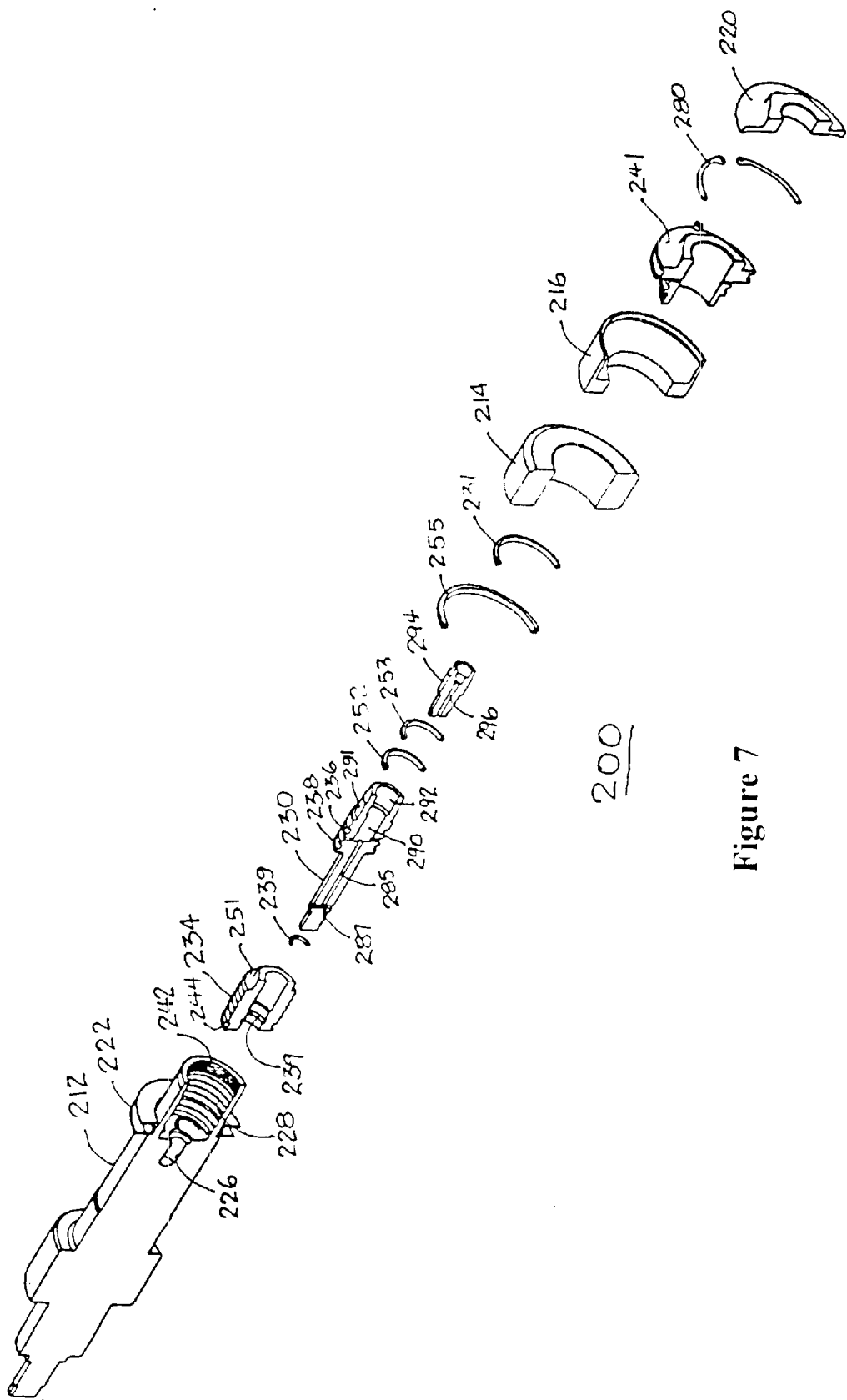
FIGS. 7 and 8 are exploded views of FIG. 6.
Figure 8:
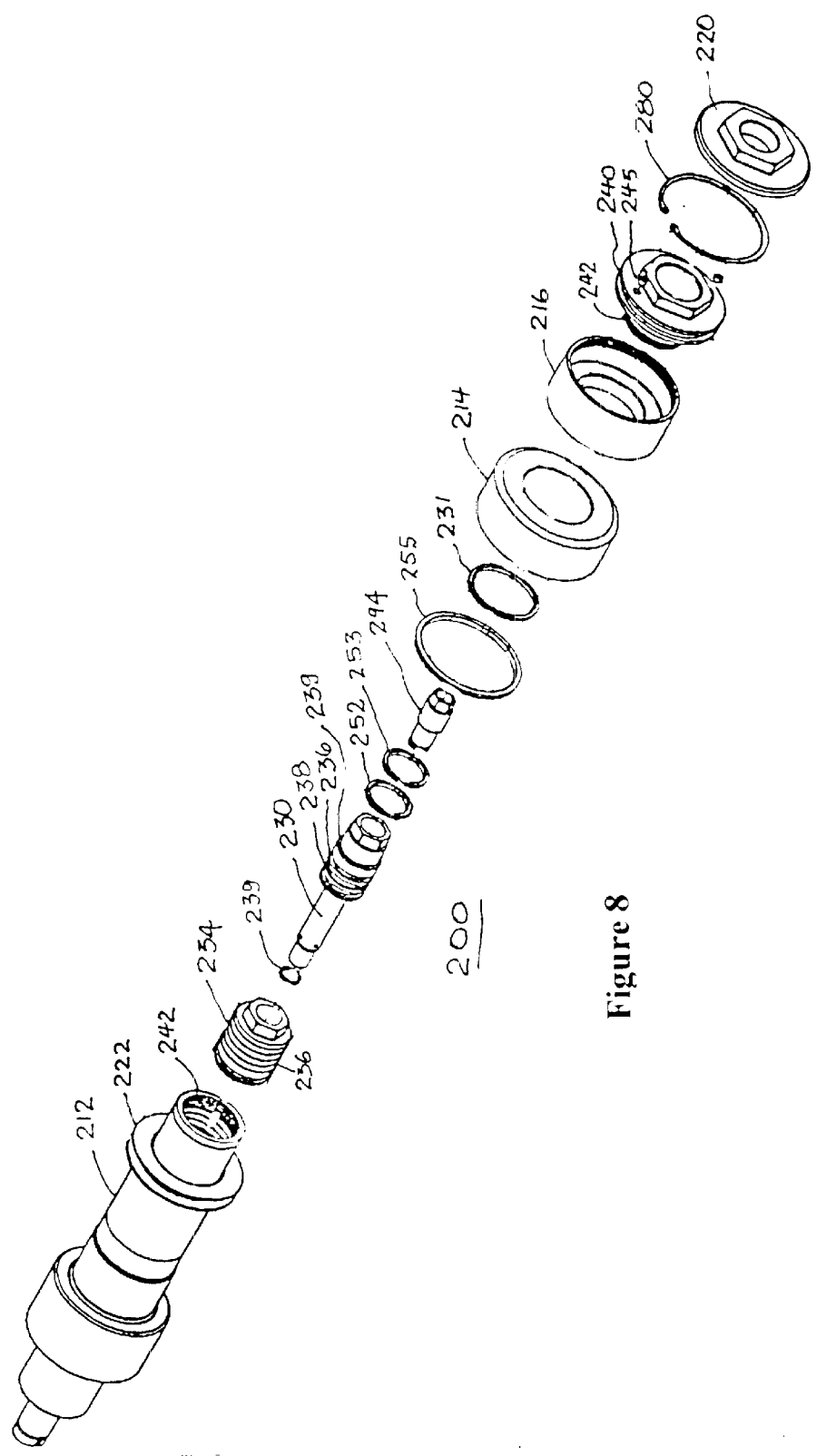

FIGS. 7 and 8 show an alternate embodiment of the present invention. Here device 200 is shown in section in FIG. 7, and in exploded format in FIG. 8.

In it driving pinion 212 is provided with a hollow internal chamber 228 which has a threaded bore 226 (similar to threaded bore 126 in FIG. 3). Bolt 230 is threaded into bore 226.

Chamber 228 is provided with a shallow ramped thread (modified buttress thread) 232 in a similar manner to chamber 18, except the slope of the threads is reversed from those shown in FIGS. 1 and 3.

A plug 234 having matching threads 236 is threaded into chamber 228 as shown. Plug 234 is provided with a bore 235 through which bolt 230 may easily pass. Plug 234 also has a smaller bore 237 which forms a sliding fit on bolt 230.

Plug 234 is also provided with recesses 239, 244 in which seals 250, 246 are seated.

Plug 234 is provided with a shoulder 251 at the right hand end thereof. Bolt 230 is threaded into threads 226 in the bore provided in pinion 212. Bolt 230 passes through plug 234 and a seal is formed with plug 234 at seal 250. Bolt 230 has a shoulder formed thereon 247 to produce an enlarged portion for bolt 230. Annular groove 236 is formed therein which is in communication with radial spaced ducts 233.

A pair of annular recesses 238 and 239 are provided in bolt 230 for seals 252 and 253 respectively.

Bolt 230 is provided with a cylindraceous chamber 290 which is threaded at 292. Chamber 290 is in communication with radially spaced ducts 233 and central duct 285 of bolt 230 which is in communication with radially extending ducts 287.

A hollow inner locking collar 240 housing a cylindraceous inner cavity 259 is provided with a threaded end 227 to be threaded into threads 242 of pinion 212. Inner locking collar 240 exhibits a complex exterior surface pattern produced as surfaces of revolution.

A groove 229 is provided for housing seal 231. Raised flange 241 contains a recess 254 housing seal 255. A bleed passage 243 is closed by bleed plug 245.

A series of radially spaced ducts 249 are formed in the inner locking collar 240 to communicate with annular recess 236 of bolt 230 (in cavity 259 of inner locking collar 240).

An outer locking collar 216 is provided in device 200 to press against roll 214. Outer locking collar 216 is slidably mounted on inner locking collar 240 and forms chamber 256 with the inner locking collar 240. It is chamber 256 in which pressure is subsequently developed to press outer locking collar 216 against roll 214 to hold roll 214 firmly in place against spacers 222 mounted on pinion 212.

Outer locking collar 216 is provided with inner groove 278 for accepting spring clip 280.

A backing plate 220 is threaded on to bolt 230 at threads 291.

A plunger 294 is threaded into bolt cavity 290 at threads 292. Plunger 294 may be adapted at 295 to be connected to a grease gun to pressurize the interior of device 200. Alternately plunger 294 may be manually advanced in threads 292 to pressurize the assembly 200.

Device 200 functions as follows:

Assume device 200 is pressurized and in an operating condition. Plunger 294 is backed off to remove the internal pressurization of the device 200. Backing plate 220 is next removed by unscrewing it from threads 291 on bolt 230.

Next the assembly of outer locking collar 216 and inner locking collar 240 are removed together as one assembly by unscrewing inner collar 240 at threads 242 on pinion 212.

Now roll 214 may be slid from pinion 212 and replaced.

When a new roll 214 has been fitted to pinion 212 the assembly comprising inner collar 240 and outer collar 216 are mounted on pinion 212 at threads 242. Backing plate 220 is next replaced on threads 291 and twisted home.

Plunger 294 is advanced in threaded bore 292 and a grease gun is applied to adapter 294 at 295. Pressurized grease is now supplied to passage 296 of plunger 294.

Pressurized grease is now supplied to chamber 290, ducts 233, annular groove 236, ducts 249, and chamber 256.

Pressurized grease is also supplied to passageway 285 and ducts 287 in bolt 230. This pressurizes chamber 228 of pinion 212.

As the pressure in chamber 228 increases, plug 234 is forced to move to the right ramping the threads 232 and expanding cavity 228 thus securing roll 214 concentrically on pinion 212.

Pressure is also building up in cavity 256 to press outer locking ring 216 against roll 214 clamp it tightly on pinion 212 against spacers 222. If occluded air is trapped in the system, backing plate 220 is removed to expose bleed plug 245. Plug 245 may now removed to allow bleeding of the pressurizing medium to allow the escape of entrapped air.

What is claimed:

1. A driving shaft having a hollow concentric cavity formed in one end of said shaft, said cavity being partially threaded with threads of a modified buttress type, a plug fitted into said cavity with threads matching those of said cavity, a sealed chamber formed in the closed end of said cavity between said plug and said cavity, hydraulic pressure means for applying fluid under pressure into said sealed chamber to cause an axial shift of said plug in said cavity to expand said hollow cavity at said plug.

2. A driving shaft as claimed in claim 1 wherein said plug has an axial duct formed therein for communication with said chamber for introducing fluid into said chamber.

3. A pinion for securing a reduction roll on said pinion against a shoulder formed adjacent the end of said pinion, a hollow cylindraceous cavity formed in said pinion at one end of said pinion, said cavity being closed at the end thereof remote from the end of said pinion, said cavity being at lease partially threaded with threads of a modified buttress type to accept a threaded plug having matching threads in said cavity, said plug and cavity forming a sealed chamber at the closed end of said cavity, conduit means for introducing pressurized fluid into said chamber to exert pressure on said plug to move said lug axially toward the end of said pinion.

4. A driving pinion for mounting a reduction roll thereon for operation in a steel mill, said pinion having a shoulder formed in the outer surface thereof adjacent the end thereof, a coaxial cylindraceous cavity fonned in said pinion extending in said pinion between said shoulder and the end of said pinion, said cavity having a threaded portion for receiving a plug therein, said plug and cavity being threaded with threads of a modified buttress type, said plug being sealed in said cavity to form a chamber in said cavity, said plug having a coaxial bore through the center of said plug, bolt means passing through said bore of said plug, said bolt having conduit means formed thereon, said bolt being threaded into said pinion at the closed end of said cavity, so that said bolt, said plug and said cavity form a sealed hollow first chamber within said cavity, hydraulic pressure fluid means attached to said bolt for pressurizing said chamber to move said plug laterally within said cavity.

5. A driving pinion as claimed in claim 4 wherein said pinion is provided with a locking collar to apply pressure to said roll to force said roll against said shoulder, said locking collar having a sealed annular second chamber formed therein at the end of said pinion for receiving fluid under pressure to exert a lateral force on said locking collar, duct means providing communication between duct means in said bolt and said sealed annular second chamber to pressurize said sealed annular second chamber simultaneously with said first chamber.

6. A driving pinion as claimed in claim 4 wherein locking collar means is mounted on said pinion for applying lateral pressure on said roll to lock it against said shoulder, said locking collar having an annular sealed second cavity formed therein which when pressurized forces said locking collar against said roll, communication means between the conduit in said bolt means and said second sealed cavity to introduce pressurized fluid in said conduit into said second cavity.

* * * * *